United States Patent [19]
Wenning et al.

[11] Patent Number: 5,916,629
[45] Date of Patent: Jun. 29, 1999

[54] HEAT-CURING, ONE-COMPONENT ADHESIVES WHICH ARE BASED ON POLYURETHANES, A PROCESS FOR THEIR PREPARATION, AND THEIR USE

[75] Inventors: Andreas Wenning, Nottuln; Felix Schmitt, Herten, both of Germany

[73] Assignee: Huels Aktiengesellschaft, Marl, Germany

[21] Appl. No.: 08/893,685

[22] Filed: Jul. 11, 1997

[30] Foreign Application Priority Data

Jul. 13, 1996 [DE] Germany .................. 196 28 394

[51] Int. Cl.⁶ .................................................. B05D 5/10
[52] U.S. Cl. .................. 427/207.1; 428/416; 428/423.1; 525/454; 525/528
[58] Field of Search ................... 525/454, 528; 428/416, 423.1; 427/207.1

[56] References Cited

U.S. PATENT DOCUMENTS

| | | | |
|---|---|---|---|
| 4,138,372 | 2/1979 | Nishikawa et al. | 525/528 |
| 4,526,913 | 7/1985 | Winkler et al. | 524/31 |
| 5,278,257 | 1/1994 | Mulhaupt et al. | 525/528 |
| 5,328,940 | 7/1994 | Zimmer | 522/31 |
| 5,391,681 | 2/1995 | Muhlebach et al. | 525/528 |
| 5,492,955 | 2/1996 | Wamprecht et al. | 525/375 |

FOREIGN PATENT DOCUMENTS

| | | |
|---|---|---|
| 652263 | 5/1995 | European Pat. Off. . |
| 3502683 | 8/1986 | Germany . |
| 7-102212 | 4/1995 | Japan . |

*Primary Examiner*—Randy Gulakowski
*Attorney, Agent, or Firm*—Oblon, Spivak, McClelland, Maier & Neustadt, P.C.

[57] ABSTRACT

Heat-curing one-component adhesives which are based on polyurethanes derived from A) a hardener component comprising polyaddition products containing hydroxyl and uretdione groups, B) a binder component comprising 1,2-epoxide compounds having more than one 1,2-epoxide group and one or more hydroxyl groups in the molecule, optionally C) further hydroxyl-containing compounds and optionally D) auxiliaries and additives known from adhesives technology; a process for preparing these compounds and to their use as heat-curing, one-component, solvent-free, thermally stable and solvent-resistant polyurethane (PU) adhesives which do not give off elimination products.

16 Claims, No Drawings

HEAT-CURING, ONE-COMPONENT ADHESIVES WHICH ARE BASED ON POLYURETHANES, A PROCESS FOR THEIR PREPARATION, AND THEIR USE

BACKGROUND OF THE INVENTION

1. Field of the Invention

The invention relates to the use of polyaddition products containing hydroxyl and uretdione groups to prepare solvent-free polyurethanes which do not give off elimination products, and to the one-component polyurethane (PU) adhesives prepared accordingly.

2. Discussion of the Background Art

Polyurethane adhesives are generally notable for very good properties of adhesion to surfaces of a very wide range of materials, for resistance to solvents, plasticizers, fats, oils and water, and for the high flexibility of the adhesive films even at low temperatures. Owing to the great variety of polyurethane chemistry, the literature—see e.g. G. Habenicht, Kleben-Grundlagen, Technologie, Anwendungen [Bonding—principles, technology, applications], Springer Verlag, Berlin, Heidelberg, New York, Tokyo, 1986—recognizes a number of different types of polyurethane adhesives. A distinction is made between one-component ("one-pack") and two-component ("two-pack") systems. Two-pack polyurethane adhesives are essentially characterized by polyisocyanates as hardeners and by predominantly oligomeric dials and/or polyols as resin. They have the advantage of presenting no great problems in terms of shelf life and that by a skillful choice and targeted reactivity of the monomers it is possible to formulate systems having different pot lives and adhesive-film-determining properties, for example strength, elasticity and resistance to chemicals. Owing to polyaddition reactions, these adhesives do not release any elimination products in the course of crosslinking.

The technical effort required when processing two-pack systems in terms of precise dosing and mixing of the components has led to the development of one-pack systems, which are easier to process. These contain isocyanato prepolymers which are prepared from polyols of relatively high molecular mass with a stoichiometric excess of polyisocyanate. Full curing takes place in most cases through moisture-induced crosslinking. For this reason, sufficient atmospheric humidity (at least 40% rel. humidity) in the processing areas is required. Consequently, these adhesives are of only limited usefulness for bonds where the parts to be joined are metallic or otherwise moisture-impermeable. Owing to the exclusion of moisture, the packaging of these one-pack adhesives during transportation and storage is critical.

A further development comprises the after-crosslinking polyurethane hot-melt adhesives (reactive hot melts) which following application from the melt provide, after cooling (physically setting), a spontaneous initial strength and subsequently react, under the action of further ambient atmospheric humidity on the remaining reactive isocyanate groups, to form the adhesive-film polymer.

In the case of the crosslinking reaction by means of moisture, the formation of carbon dioxide as a result of the breakdown of the unstable carbamic acid derivatives may be critical, especially when relatively thick adhesive films of relatively high viscosity are present and when the gas bubbles are enclosed in the adhesive film. Moreover, moisture-curing PU adhesives do not attain the strengths of two-pack PU adhesives.

An alternative to the moisture-curing systems is represented by one-pack heat-activatable PU adhesives. These consist of polyol resins and of polyisocyanates whose isocyanate groups are inhibited by so-called blocking agents. Elevated temperatures lead to cleavage of the hardener molecules, in the course of which the blocking agents are eliminated and the polymer Is generated by polyurethane formation. Here too, a disadvantage is the formation of elimination products in the sense of the adverse effect this has on the adhesion properties. Moreover, the organic structure of some blocking agents renders them toxicologically unacceptable.

Polyurethanes are likewise employed as solvent-containing adhesive systems. In this case, a distinction may be made between physically setting and chemically reacting systems. Both systems possess high molecular mass hydroxy polyurethanes as polymers, while the chemically reacting systems additionally include a polyisocyanate as second component in the solvent system. In order to form the adhesive film, a process which may take place at normal or elevated temperature, it is necessary to remove the solvent.

However, the interests of environmental protection and adhesive technology make it desirable to provide adhesives which are free from emissions in the form of solvent or of elimination products, such as blocking agents.

The object on which the invention is based, therefore, was to develop new PU adhesives unhampered by the above-mentioned disadvantages of the prior art; in other words, they should be one-component systems free from blocking agents and solvents and should be able to be crosslinked thermally to form thermosets. Furthermore, subsequent to curing, the PU adhesives should exhibit bonds having good temperature and solvent resistance properties.

This object has been achieved in accordance with the disclosed invention. The text below describes the novel resin/hardener mixture in which the curing agents are polyaddition products containing hydroxyl and uretdione groups.

SUMMARY OF THE INVENTION

The present invention therefore provides heat-curing, one-component, solvent-free polyurethanes which do not give off elimination products and which as one-component adhesives comprise A) a hardener component comprising polyaddition products containing hydroxyl and uretdione groups, B) a binder component comprising 1,2-epoxide compounds having more than one 1,2-epoxide group and one or more hydroxyl groups in the molecule, optionally C) further hydroxyl-containing compounds and optionally D) auxiliaries and additives known from adhesives technology.

DETAILED DESCRIPTION OF THE INVENTION

The hardener component A) is obtainable by reacting (i) uretdiones based on polyisocyanates, based especially on aliphatic and/or cycloaliphatic diisocyanates having at least two free isocyanate groups, and (ii) isocyanate-reactive, difunctional and optionally monofunctional compounds, especially diols and/or chain extenders, and optionally monoalcohols or monoamines, where the polyaddition products which contain uretdione groups can be prepared either in a solvent or, in particular without solvent, and the binder component C) consists of hydroxyl-containing compounds having a molecular mass of at least 60, an OH number of at least 20 mg of KOH/g and a hydroxyl functionality of at least 2.

Component C) is present in amounts of from 0 to 99% by mass, relative to component B). The mixing ratio of all hydroxyl-containing compounds and the polyaddition products containing hydroxyl and uretdione groups (crosslinkers) is generally chosen such that there are from 0.5 to 10, preferably from 0.8 to 5, OH groups per NCO group.

The invention additionally provides a process for preparing these heat-curing, one-component, solvent-free polyurethanes which do not give off elimination products and which comprise A) a hardener component comprising polyaddition products containing hydroxyl and uretdione groups, B) a binder component comprising 1,2-epoxide compounds having more than one 1,2-epoxide group and one or more hydroxyl groups in the molecule, optionally C) further hydroxyl-containing compounds and optionally D) auxiliaries and additives known from adhesives technology, of the abovementioned type.

The invention also provides for the use of the novel polyurethanes as heat-curing, one-component, solvent-free adhesives which do not give off elimination products, for the bonding of any desired heat-resistant substrates, especially for the bonding of metals.

The hardener component A) comprises polyaddition compounds which carry uretdione groups. The uretdione products, which in addition to the uretdiones may also contain up to 40% by mass of trimers and higher oligomers, are based on the reaction products of the dimerization of polyisocyanates, especially on the dimerization products of aliphatic and/or cycloaliphatic diisocyanates. Diisocyanates which are employed in particular are 1,6-diisocyanatohexane (HDI), 3-methyl-1,5-diisocyanatopentane (MPDI), 2,2,4- and 2,4,4-trimethyidiisocyanatohexane (TMDI), 1-isocyanato-3-isocyanatomethyl-3,5,5-trimethylcyclohexane (IPDI)and 4,4'-diisocyanatodicyclohexylmethane ($H_{12}$MDI) or any desired mixtures of these diisocyanates.

The preparation of polyaddition compounds of this kind containing uretdione groups by a reaction of uretdione-group-containing polyisocyanates with isocyanato-reactive, difunctional and optionally monofunctional compounds, especially diols and/or chain extenders, and also optionally monoalcohols or monoamines, is known in principle and is described, for example, in DE-C 24 20 475, DE-C 30 30 572, DE-C 30 30 588, DE-C 30 30 539, EP-B 0 669 353 and EP-B 0 669 354. The polyaddition compounds containing uretdione groups which are used as hardeners generally have an overall NCO content of from 3 to 26% (determined by heating the compounds at 180° C. for from 30 to 60 minutes). This "hot value" is a direct measure of the content of uretdione groups in the reaction product. The melting point of these compounds is generally in the range from 40 to 130° C.

The binder component B) comprises any desired aliphatic, cycloaliphatic, aromatic or heterocyclic compounds which carry at least two epoxide groups, i.e. preferably 1,2-epoxide groups, and which have one or more hydroxyl groups in the molecule.

The suitable hydroxyl-containing epoxy resins which are preferred as component B) have epoxide equivalent weights of from about 800 to 3500 and OH equivalent weights of from 300 to 250.

The epoxy resins are prepared by known methods, for example by reacting bisphenol A with epichlorohydrin. The resulting products have degrees of condensation of between 0 and 27, corresponding to a molecular mass of from 380 to 8000.

Suitable binder components C) are compounds containing functional groups which in the course of the curing process can be reacted with isocyanate groups as a function of temperature and time, examples being hydroxyl, carboxyl, mercapto, amino, urethane and (thio)urea groups. As polymers it is possible to employ additional polymers, condensation polymers and polyaddition compounds.

Preferred components are primarily polyethers, polythioethers, polyacetals, polyesteramides, amino resins and their modification products with polyfunctional alcohols, polyazomethines, polysulfonamides, acrylate resins, melamine derivatives, cellulose esters and cellulose ethers, and polyureas, but especially polyols, polyesters and polyurethanes.

Examples of suitable polyols are ethylene glycol, propylene 1,2- and 1,3-glycol, butylene 1,4- and 2,3-glycol, di-β-hydroxybutanediol, 1 6-hexanediol, 1,7-heptanediol, 1,8-octanediol, 1,12-dodecanediol, 1,18-octadecanediol, neopentylglycol, cyclohexanediol, bis(1,4-hydroxymethyl) cyclohexane, 2,2-bis(4-hydroxycyclohexyl)propane, 2,2-bis [4-(β-hydroxyethoxy)phenyl-1-propane, 2-methyl-1,3-propanediol, 3-methyl-1,5-pentanediol, 2,2,4- and 2,4,4-trimethyl-1,6-hexanediol, glycerol, 1,1,1-trimethylolpropane, 1,1,1-trimethylolethane, 1,2,6-hexanetriol, 1,2,4-butanetriol, tris(β-hydroxyethyl) isocyanurate, pentaerythritol, mannitol, sorbitol and also diethylene glycol, triethylene glycol, tetraethylene glycol, dipropylene glycol, polypropylene glycols, polybutylene glycols, xylylene glycols and neopentylglycol hydroxypivalate. It is of course also possible to employ mixtures of two or more polyhydroxy compounds.

Carboxylic acids which are preferred for the preparation of polyesters may be aliphatic, cycloaliphatic, aromatic and/or heterocyclic in nature and may optionally be substituted by halogen atoms and/or unsaturated. Examples of these acids which may be mentioned are succinic, adipic, suberic, azelaic, sebacic, phthalic, terephthalic, isophthalic, trimellitic, pryomellitic, tetrahydrophthalic, hexahydrophthalic, hexahydroterephthalic, di- and tetrachlorophthalic, endomethylenetetrahydrophthalic, dodecanedioic, dimeric fatty, glutaric, maleic and fumaric acids and—where obtainable—their anhydrides, dimethyl terephthalate and bis-glycol terephthalate.

Suitable polyhydric alcohol components for preparing the polyesters are the polyols mentioned above by way of example.

Polyesters of lactones or hydroxycarboxylic acids may likewise be employed.

When preparing the polyester polyols it is of course possible to employ any desired mixtures of the carboxylic acids mentioned by way of example, and/or their anhydrides or esters, or any desired mixtures of the exemplified polyhydric alcohols.

The hydroxyl-containing polyesters in the binder component C) preferably consist of two types having different characteristics. Preferred polyesters of type I have an OH functionality of from 2.0 to 5.0, preferably from 2.0 to 4.0, an OH number of from 20 to 200 mg of KOH/g, preferably from 30 to 150 mg of KOH/g, a molecular mass of from 1500 to 30,000, preferably from 2000 to 7000, a viscosity at 130° C. of <300,000 mPa·s, a melting point or flow point of up to about 230° C., and a glass transition temperature (Tg) of from −80 to 120° C.

The morphology of the polyesters ranges from amorphous to crystalline.

Preferred hydroxyl-containing polyesters of type II have an OH functionality of from 2.0 to 5.0, an OH number of from 100 to 600 mg of KOH/g, preferably from 100 to 400 mg of KOH/g, and a molecular mass of from 100 to 2000.

The polyesters of both types may also possess acid numbers of up to about 35 mg of KOH/g.

The polyesters can be obtained in a known manner by condensation in an inert gas atmosphere at temperatures from 100 to 260° C., preferably from 130 to 220° C., in the melt or by an azeotropic procedure, as is described, for example, in Houben-Weyl, Methoden der Organischen Chemie, Vol. 14/2, 1–5, 21, 23, 40, 44, Georg Thieme Veriag, Stuttgart, 1963 or in C. R. Martens, Alkyd Resins, 51–59, Reinhold Plastics Appi. Series, Reinhold Publishing Comp., New York, 1961.

The polyurethanepolyols are reaction products of
(i) a polyisocyanate component comprising at least one organic polyisocyanate, with
(ii) a polyol component comprising at least one di- to hexahydric alcohol which may contain ester, ether and/or acrylate linkages.

Suitable polyisocyanates (i) include both aromatic and, in particular, (cyclo)aliphatic diisocyanates, such as 1,6-diisocyanatohexane (HDI), 3-methyl-1,5-diisocyanatopentane (MPDI), 2,2,4- and 2,4,4-trimethyldiisocyanatohexane (TMDI), 1-isocyanato-3-isocyanatomethyl-3,5,5-trimethylcyclohexane (IPDI) and 4,4′-diisocyanatodicyclohexylmethane ($H_{12}$MDI). Also possible is molecular enlargement of the polyisocyanates mentioned by way of example, said molecular enlargement being accomplished by dimerization, trimerization, carbodiimidization, allophanate formation and biuretization, as is described, for example, in DE-A 29 29 150. In the preparation of the polyurethanepolyols it is of course possible to employ any desired mixtures of the polyisocyanates mentioned by way of example.

Typical examples of polyhydric alcohols (ii) without additional functional groups are, for example, ethylene glycol, propylene 1,2- and 1,3-glycol, butylene 1,4- and 2,3-glycol, di-β-hydroxybutanediol, 1,6-hexanediol, 1,7-heptanediol, 1,8-octanediol, 1,12-dodecanediol, 1,18-octadecanediol, neopentylglycol, cyclohexanediol, bis(1,4-hydroxymethyl)cyclohexane, 2,2-bis(4-hydroxycyclohexyl) propane, 2,2-bis[4-(β-hydroxyethoxy)phenyl]-propane, 2-methyl-1,3-propanediol, 3-methyl-1,5-pentanediol, 2,2,4- and 2,4,4-trimethyl-1,6-hexanediol, glycerol, 1,1,1-trimethylolpropane, 1,1,1-trimethylolethane, 1,2,6-hexanetriol, 1,2,4-butanetriol, tris(P-hydroxyethyl) isocyanurate, pentaerythritol, mannitol, sorbitol and also diethylene glycol, triethylene glycol, tetraethylene glycol, dipropylene glycol, polypropylene glycols, polybutylene glycols, xylylene glycols and neopentylglycol hydroxypivalate. It is of course also possible to employ mixtures of two or more polyhydroxy compounds.

Examples of suitable polyesterpolyols (ii) are, in particular, the reaction products, which are known per se in polyurethane chemistry, of polyhydric alcohols of the abovementioned type with polycarboxylic acids. Suitable polycarboxylic acids may be aliphatic, cycloaliphatic, aromatic and/or heterocyclic in nature and may optionally be substituted by halogen atoms and/or unsaturated. Examples of these acids which may be mentioned are succinic, adipic, suberic, azelaic, sebacic, phthalic, terephthalic, isophthalic, trimellitic, pryomellitic, tetrahydrophthalic, hexahydrophthalic, hexahydroterephthalic, di- and tetrachlorophthalic, endomethylenetetrahydrophthalic, dodecanedioic, dimeric fatty, glutaric, maleic and fumaric acids and—where obtainable—their anhydrides, dimethyl terephthalate and bis-glycol terephthalate. Polyesters in the form of lactones or hydroxycarboxylic acids can likewise be employed. For the preparation of the polyesterpolyols, it is of course possible to employ any desired mixtures of the polyhydric alcohols mentioned by way of example or any desired mixtures of the carboxylic acids mentioned by way of example, and/or their anhydrides or esters.

Suitable polyetherpolyols (ii) are the ethoxylation and/or propoxylation products, known per se from oolyurethane chemistry, of appropriate divalent to tetravalent starter molecules, for example water, ethylene glycol, propylene 1,2- and 1,3-glycol, 1,1,1-trimethylolpropane, glycerol and/ or pentaerythritol.

The polyhydroxypolyacrylates (ii) comprise copolymers, known per se, of simple esters of acrylic acid and/or methacrylic acid and optionally styrene, with hydroxyalkyl esters of these acids being used in order to introduce the hydroxyl groups, examples of such esters being the 2-hydroxyethyl, 2-hydroxypropyl and 2-, 3- and 4-hydroxybutyl esters.

The polyhydroxypolyesters as described above, polyhydroxypolyethers and polyhydroxypolyacrylates generally have a hydroxyl number of from 20 to 200 mg of KOH/g, preferably from 50 to 130 mg of KOH/g, based on 100% products.

The polyurethanepolyols are preferably prepared in inert solvents, for example ketones, at temperatures from 20 to 90° C. In this context the amounts of the reactants generally correspond to an NCO/OH ratio of from 1:1.4 to 1:15.

The polyols and hydroxyl-containing polyesters and polyurethanes mentioned by way of example can be mixed with one another in any desired proportions and can be reacted with the hardener component A) and binder component B).

In the course of the preparation of the novel adhesives it is possible, if required, for the additives and auxiliaries which are customary in the adhesive sector, such as catalysts, adhesion promoters, adhesive resins, leveling agents, fillers, pigments, dyes, UV stabilizers and antioxidants, to find application.

For the preparation of the novel PU adhesives, the hardener component A) is either homogenized in an inert solvent, for example acetone or methyl ethyl ketone, or after milling is mixed and homogenized in the melt, in both cases together with the hydroxyl-containing polymers and optionally with catalysts and also with further auxiliaries and additives. In the case of homogenization in a solvent, the solvent is removed by distillation in vacuo. The resulting product is then ground using a mill to a particle size of less than 500 μm. Homogenization in the melt can take place in suitable apparatus, for example heatable compounders, but preferably by extruding, in the course of which an upper temperature limit of 180° C. should not be exceeded. The compounded or extruded mass is cooled to room temperature, comminuted appropriately and ground using a mill to less than 500 μm.

Application of the one-component adhesive to the substrates which are to be bonded may take place, for example, by electrostatic powder spraying, fluidized-bed sintering, electrostatic fluidized-bed sintering, melting or sieving. Following application of the novel adhesive formulation to the clean surfaces of the parts to be joined, the bond is fixed optionally, for example, by means of appropriate tools or a weight. Curing of the coated workpieces takes place at from 150 to 220° C. over a period of from 60 minutes to 4 minutes, preferably at from 160 to 200° C. over a period of from 30 minutes to 6 minutes.

The novel resin/hardener systems can be employed, for example, as coating compositions for various substrates or, preferably, as adhesive, especially as one-pack PU adhesives for bonding a wide variety of materials, for example metals, light metals, but also nonmetallic materials, such as glass, ceramic or plastic. The substrates used must be resistant to heat. The novel heat-curing PU adhesives give rise to bonds of excellent thermal durability in accordance with the tensile shear test coupled with adjustable flexibility. The adhesives are extremely advantageous from an ecological viewpoint since they are solvent-free and do not release elimination products in the course of curing. Moreover, the novel coatings are distinguished by good resistance toward aggressive solvents, such as methyl ethyl ketone, for example.

The subject-matter of the invention is illustrated in more detail below with reference to examples.

The abbreviations used in the examples have the following meanings:

Aa=Adipic acid

MPA=Dimethylolpropionic acid

HD=1,6-Hexanediol

IPA=Isophthalic acid

NPG=Neopentylglycol (2,2-dimethyl-1,3-propanediol)

p=1,5-Pentanediol

TMHD=Trimethylhexanediol

TMP=1,1,1-Trimethylolpropane

A) Preparation of the polyaddition products containing hydroxyl and uretdione groups The polyaddition products containing hydroxyl and uretdione groups are produced by a known method. The physical and chemical characteristics of the compounds used as hardeners, and the molar compositions thereof, are summarized in Table 1.

The IPDI-uretdione prepared by a known method as an example of uretdiones has the following NCO contents:

| free: | 16.8 to 18.5% by mass |
|---|---|
| total: | 37.5 to 37.8% by mass |

The chain extender given by way of example, produced from 1 mol of adipic acid and 2 mol of neopentylglycol, has an OH number of 335±15 mg of KOH/g and a viscosity at 25° C. of about 1500 mpa·s.

TABLE 1

Composition of Polyaddition Products Containing Hydroxyl and Uretdione Groups

| | Composition [mol] | | | NCO Content [% by mass] | | Melting Range [° C.] | Glass Transition Temperature [° C.] |
|---|---|---|---|---|---|---|---|
| Example | IPDI Uretdione | Diols | Chain Extender | Free | Total | | |
| A)1 | 7 | 6.75 P | 1.25 Aa/NPG | <0.1 | 13.3 | 104–115 | 85 |
| A)2 | 4 | — | 5 Aa/NPG | 0 | 9.3 | 71–74 | 37 |

B) Hydroxyl-containing compounds

Table 2 below gives an overview of the polyols, hydroxyl-containing polyesters and polyurethanes used to fomulated PU adhesives.

TABLE 2

Hydroxyl-containing Compounds Used

| Example | Manufacturer/ Country | Name | Chemical and Physical Characteristics | | |
|---|---|---|---|---|---|
| | | | OH Number [mg of KOH/g] | Acid Number [mg of KOH/g] | Melting Range [° C.] |
| B)1 | Shell/FRG | Epikote ®1004 | 185 | 0 | 90–100 |
| B)2 | Shell/FRG | Epikote ®1007 | 193 | 0 | 120–130 |
| B)3 | Shell/FRG | Epikote ®1009 | 216 | 0 | 140–155 |
| B)4 | Hüls/FRG | DYNACOLL ®7130 | 31–39 | <2 | — |
| B)5 | Solvay/FRG | Capa 305 | 310 | <0.75 | 0–10 |
| B)6 | Hüls/FRG | Polyesterpolyol 1[1)] | 104 | <1 | — |
| B)7 | Hüls/FRG | Polyurethanepolyol 2[2)] | 76 | 15 | — |

[1)]IPA/HD/TMP/TMHD (7:5:2:1)
[2)]IPDI/trimeric IPDI/TMP/DMPS/Oxyester T 1136 (Hüls AG) (2:1:2:1:2); the molar composition is indicated in brackets C) Polyurethane adhesives General preparation procedure for the novel adhesives in solvent The polyaddition products containing hydroxyl and uretdione groups, hydroxyl-containing compounds and optionally catalysts, auxiliaries and additives are dissolved in an inert solvent such as, for example, acetone. After a homogeneous solution has been obtained, the solvent is removed in vacuo, the solid is comminuted and the comminuted solid is ground in a mill to a particle size <500 μm. This is followed by drying of the substance to constant weight.

General preparation procedure for the novel adhesives in the melt

Hardeners and resins—together if desired with catalyst, auxiliaries and additives—are kneaded in a plastograph at from 70 to 140° C. The cooled mixture of solids is subsequently ground to a particle size of <500 μm.

In the case of homogenization in an extruder, the polyaddition compounds containing hydroxyl and uretdione groups are fed into the intake barrel of a twin-screw extruder which is at a temperature of 25 to 170° C., the polyol component at a temperature of 25 to 170° C. being metered in simultaneously. The uretdione or the polyol component includes, if appropriate, the required quantity of catalyst, based on the end product.

The extruder used is composed of ten barrels which are put under individual thermal control by way of five heating zones. The temperature of the heating zones are within a large temperature range from 50 to 180°. All temperatures are intended temperatures, and regulation in the barrels takes place by means of electrical heating and pneumatic cooling. The die element is heated by means of an oil thermostat. The speed of rotation of the twin screw, fitted with conveying and, optionally, kneading elements, is between 50 and 380 rpm.

The mixture is obtained at a rate of from 1 to 130 kg/h. It is either cooled, then comminuted or shaped and bagged, or the actual melt is shaped, cooled and bagged. The fractionated extrudate is ground in a mill to a particle size <500 μm.

Application of the novel adhesives

The novel adhesive formulations are applied through a 100 mm sieve to degreased and roughened standard steel panels (St 1405).

Alternatives to this are electrostatic powder spraying, fluidized-bed sintering and electrostatic fluidized-bed sintering, and melting or partial melting of the compounds.

The bonds are produced in accordance with DIN EN 1465. The tensile shear strengths of these metal bonds, cured at different temperatures in a convection oven, are listed in Table 3.

TABLE 3

| Formulation | C)1 | C)2 | C)3 | C)4 | C)5 | C)6 | C)7 | C)8 | C)9 | C)10 | C)11 | C)12 | C)13 | C)14 | C)15 |
|---|---|---|---|---|---|---|---|---|---|---|---|---|---|---|---|
| Hardener A)1 [g] | 34.0 | — | 50.8 | 28.3 | 34.8 | — | 26.2 | 21.0 | 37.3 | — | 28.4 | 38.0 | 28.9 | 44.6 | 42.0 |
| Hardener A)2 [g] | — | 43.0 | — | — | — | 43.7 | — | — | — | 46.7 | — | — | — | — | — |
| Polyol ac. to B)1 [g] | 66.0 | 57.0 | 49.2 | 71.7 | — | — | — | — | — | — | — | 31.0 | — | 27.7 | 29.0 |
| Polyol acc. to B)2 [g] | — | — | — | — | 65.2 | 56.3 | 73.8 | 79.0 | — | — | — | — | — | — | — |
| Polyol ac. to B)3 [g] | — | — | — | — | — | — | — | — | 62.7 | 53.3 | 71.6 | — | 67.6 | — | — |
| Polyol ac. to B)4 [g] | — | — | — | — | — | — | — | — | — | — | — | 31.0 | — | — | — |
| Polyol ac. to B)5 [g] | — | — | — | — | — | — | — | — | — | — | — | — | 3.5 | — | — |
| Polyol ac. to B)6 [g] | — | — | — | — | — | — | — | — | — | — | — | — | — | 27.7 | — |
| Polyol ac. to B)7 [g] | — | — | — | — | — | — | — | — | — | — | — | — | — | — | 29.0 |
| Ratio OH/NCO | 2:1 | 2:1 | 1:1 | 3:1 | 2:1 | 2:1 | 3:1 | 4:1 | 2:1 | 2:1 | 3:1 | 1:1 | 3:1 | 1:1 | 2:1 |
| Tensile shear strength [N/mm$^2$] at 23° C. | 19 | 22 | 17 | 20 | 19 | 14 | 20 | 23 | 16 | 16 | 18 | 22 | 18 | 21 | 22 |
| Tensile shear strength [N/mm$^2$] at 100° C. | 10 | 11 | 14 | 6 | 12 | 5 | 9 | 12 | 9 | 9 | 12 | 8 | 7 | 6 | 11 |

Notes:
Curing conditions: 200° C./20 minutes

Obviously, numerous modifications and variations of the present invention are possible in light of the above teachings. It is therefore to be understood that within the scope of the appended claims, the invention may be practiced otherwise than as specifically described herein.

The disclosure of German priority patent application 196 28 394.9, filed Jul. 13, 1996, is hereby incorporated by reference.

What is claimed as new and desired to be secured by Letters Patent of the United States is:

1. A heat-curing one-component adhesive which comprises a mixture of components
   A) a hardener component comprising at least one polyaddition product containing hydroxyl and uretdione groups,
   B) a binder component comprising at least one 1,2-epoxide compound having more than one 1,2-epoxide group and one or more hydroxyl groups in the molecule, and optionally
   C) further hydroxyl-containing compounds.

2. A one-component adhesive as claimed in claim 1, wherein the hardener component A is obtained by reacting at least one of (i) uretdiones based on polyisocyanates having at least two free isocyanate groups, and at least one of (ii) isocyanate-reactive, difunctional and optionally monofunctional compounds.

3. A one-component adhesive as claimed in claim 2, wherein the polyisocyanate comprises an aliphatic and/or cycloaliphatic diisocyanate.

4. A one-component adhesive as claimed in claim 2, wherein the polyisocyanate comprises a uretdione of isophorone diisocyanate (IPDI).

5. A one-component adhesive as claimed in claim 2, wherein the isocyanate-reactive compound comprises a diol and/or chain extender, and optionally a monoalcohol and/or a monoamine.

6. A one-component adhesive as claimed in claim 1, wherein the binder component B comprises a 1,2-epoxide compound based on bisphenol A and epichlorohydrin, having a degree of condensation of between 0 and 27, corresponding to a molecular mass of between 380 and 8000.

7. A one-component adhesive as claimed in claim 1, wherein hydroxyl-containing compounds C comprise at least one compound having a molecular mass of at least 60, an OH number of at least 20 mg of KOH/g and a hydroxyl functionality of at least 2.

8. A one-component adhesive as claimed in claim 7, wherein hydroxyl-containing compounds C comprise at least one compound selected from polyols, polyesters, and polyurethanes.

9. A one-component adhesive as claimed in claim 1, wherein the OH/NCO ratio is from 0.5 to 10.

10. A one-component adhesive as claimed in claim 9, wherein the OH/NCO ratio is from 0.8 to 5.

11. A one-component adhesive as claimed in claim 1, additionally containing, as a catalyst, at least one organotin compound in a concentration of from 0.01 to 1% by mass.

12. A one-component adhesive as claimed in claim 1, prepared by (1) homogenization of the components in an inert solvent which is removed after reaction has taken place, or (2) reaction without solvent in a compounder or twin-screw extruder, at temperatures not above 180° C.

13. A method of bonding a solid material to a heat-resistant substrate comprising applying the composition of claim 1 between said solid material and substrate and curing said composition.

14. The method of claim 13, wherein the solid material is a metal.

15. A method comprising coating a substrate with the composition of claim 1 and heat-curing the coating.

16. The product made by the process of claim 15.

* * * * *